US012692581B2

(12) United States Patent
Zhang et al.

(10) Patent No.: US 12,692,581 B2
(45) Date of Patent: Jul. 28, 2026

(54) TIRE CORD STEEL WITH HIGH STRENGTH AND LOW WIRE BREAKAGE RATE, AND ROLLING METHOD AND USE THEREOF

(71) Applicant: WUHAN IRON AND STEEL CORP., Wuhan City (CN)

(72) Inventors: Fan Zhang, Wuhan City (CN); Anchao Ren, Wuhan City (CN); Lei Guo, Wuhan City (CN); Tuming Ye, Wuhan City (CN)

(73) Assignee: WUHAN IRON AND STEEL CORP., Wuhan City (CN)

( * ) Notice: Subject to any disclaimer, the term of this patent is extended or adjusted under 35 U.S.C. 154(b) by 393 days.

(21) Appl. No.: 18/463,281

(22) Filed: Sep. 7, 2023

(65) Prior Publication Data

US 2023/0416882 A1 Dec. 28, 2023

Related U.S. Application Data

(63) Continuation of application No. PCT/CN2022/100459, filed on Jun. 22, 2022.

(30) Foreign Application Priority Data

Aug. 26, 2021 (CN) .......................... 202110992564.8

(51) Int. Cl.
*C22C 38/00* (2006.01)
*B60C 9/00* (2006.01)
(Continued)

(52) U.S. Cl.
CPC .......... *C22C 38/002* (2013.01); *B60C 9/0007* (2013.01); *C21D 8/06* (2013.01);
(Continued)

(58) Field of Classification Search
CPC ............ B60C 9/0007; C21D 2211/001; C21D 2211/009; C21D 8/065; D02G 3/48;
(Continued)

(56) References Cited

U.S. PATENT DOCUMENTS

| | | | |
|---|---|---|---|
| 2006/0048864 A1* | 3/2006 | Nagao | C21D 8/06 |
| | | | 148/320 |
| 2020/0370142 A1* | 11/2020 | Manabe | C22C 38/04 |

FOREIGN PATENT DOCUMENTS

| | | | |
|---|---|---|---|
| CN | 103305675 A | * | 9/2013 |
| JP | 2005021899 A | * | 1/2005 |

OTHER PUBLICATIONS

NPL: on-line translation of CN 103305675 A, Sep. 2013 (Year: 2013).*

(Continued)

*Primary Examiner* — Jie Yang
(74) *Attorney, Agent, or Firm* — Syncoda LLC; Feng Ma

(57) ABSTRACT

Chemical compositions of a tire cord steel with high strength and low wire breakage rate may include Nb, V and N, and ([Nb]+[V])/[N] is 3-4.5, [Nb] representing the mass fraction of niobium element, [V] representing the mass fraction of vanadium element, and [N] representing the mass fraction of nitrogen element. The method includes: obtaining a steel billet of the tire cord steel; and sequentially performing a heating-before-rolling, a hot-rolling and a cooling-after-rolling on the steel billet to obtain a wire rod of the tire cord steel. The application of the tire cord steel is to apply the tire cord steel in tire skeleton materials. The strength and toughness of the tire cord steel can be improved by adding Nb, V and N, and then controlling the relationship between Nb, V and N.

8 Claims, 1 Drawing Sheet

(51) Int. Cl.

| | |
|---|---|
| *C21D 8/06* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *D02G 3/48* | (2006.01) |
| *D07B 1/06* | (2006.01) |

(52) U.S. Cl.
CPC .............. *C22C 38/02* (2013.01); *C22C 38/04* (2013.01); *C22C 38/06* (2013.01); *C22C 38/12* (2013.01); *C22C 38/14* (2013.01); *D02G 3/48* (2013.01); *D07B 1/066* (2013.01); *C21D 2211/001* (2013.01); *C21D 2211/009* (2013.01)

(58) Field of Classification Search
CPC ....... D07B 1/066; C22C 38/001; C22C 38/02; C22C 38/04; C22C 38/32; C22C 38/12
See application file for complete search history.

(56) References Cited

OTHER PUBLICATIONS

NPL: On-line translation of JP 2005 021899 A, Jan. 2005 (Year: 2005).*

* cited by examiner

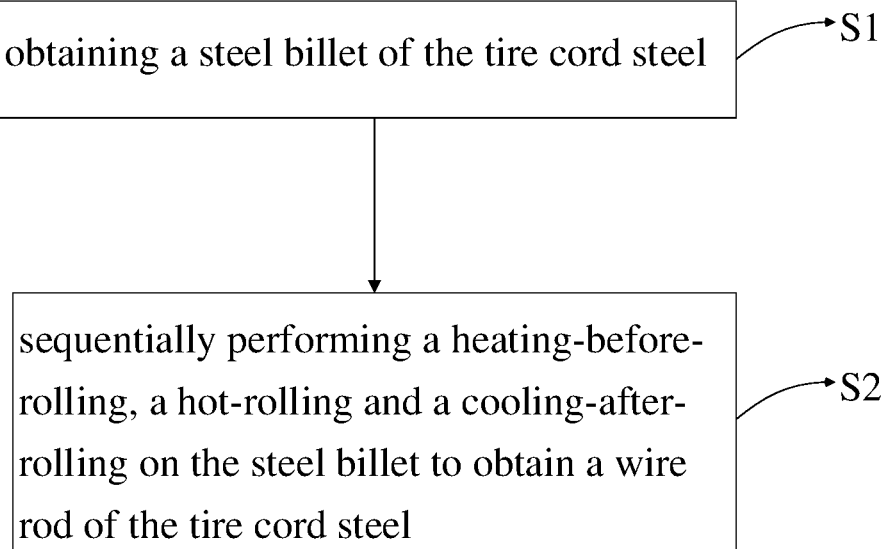

TIRE CORD STEEL WITH HIGH STRENGTH AND LOW WIRE BREAKAGE RATE, AND ROLLING METHOD AND USE THEREOF

CROSS REFERENCE TO RELATED APPLICATIONS

This is a continuation-in-part of International Application No. PCT/CN2022/100459 filed on Jun. 22, 2022, which claims priority to Chinese patent application No. 202110992564.8 filed on Aug. 26, 2021. The disclosures of the above-referenced applications are hereby incorporated by reference in their entirety.

BACKGROUND

A tire cord steel is a base material for making steel cords, known as "the jewel in the crown of wire products". Any slight defects in the tire cord steel will be exposed during a deep machining, resulting in wire breakage of tire cord steel or reduced steel performance.

Currently, a strength improvement of tire cord steel is realized by increasing a content of carbon. According to a strength grade, the tire cord steel may be divided into 70 C (normal strength), 80 C (high strength), and 90 C (ultra-high strength). A composition system of the tire cord steel is mainly composed of a carbon steel. However, simply increasing the content of carbon in order to improve the strength, on the one hand, will bring iron and steel enterprises problems, such as difficulty in uniform control of the high-carbon steel and high production costs, and requires measures such as "twice-heating production", increasing a temperature of a heating furnace, and prolonging a heating time, which make it difficult to guarantee quality stability of wire rod of the high-carbon tire cord steel. On the other hand, the high-carbon tire cord steel produced by a complex process will not only increase purchase cost of users, but also reduce drawability performance of the wire rod and affect thermal conductivity of a final product. Therefore, it is a big problem on how to improve a strength and toughness performance of the tire cord steel without increasing the content of carbon.

SUMMARY

The present disclosure belongs to the field of metallic materials, and in particular relates to a tire cord steel with high strength and low wire breakage rate, and rolling method and use thereof.

The present disclosure provides a tire cord steel with high strength and low wire breakage rate, and rolling method and use thereof, which solves a technical problem of difficulty in improving a strength and toughness performance of the tire cord steel without increasing the content of carbon.

In one aspect of the present disclosure, provided is a tire cord steel with high strength and low wire breakage rate, chemical compositions by mass fraction of which may include: C: 0.80%-0.85%, Mn: 0.46%-0.59%, Nb: 0.006%-0.012%, V: 0.006%-0.012%, Si: 0.15%-0.25%, P≤0.01%, S≤0.01%, B: 0.0005%-0.0009%, Als≤0.0008%, Ti≤0.0005%, and the rest being Fe and inevitable impurities; the chemical composition of the tire cord steel may further include N, and the mass fractions of Nb, V, and N satisfy the following relationships: ([Nb]+[V])/[N] may be between 3-4.5, [Nb] representing the mass fraction of niobium element, [V] representing the mass fraction of vanadium element, and [N] representing the mass fraction of nitrogen element.

In another aspect of the present disclosure, provided is a method for rolling tire cord steel, which includes: obtaining a steel billet of the tire cord steel; and sequentially performing heating-before-rolling, hot-rolling and cooling-after-rolling on the steel billet to obtain a wire rod of the tire cord steel; the heating-before-rolling may include a preheating stage, a first heating stage, a second heating stage and a soaking stage; the hot-rolling may adopt a high-temperature austenite crystallization controlled-rolling; and the hot-rolling may sequentially include a rough rolling, an intermediate rolling, a pre-finish rolling, a finish rolling and a sizing and reducing.

In yet another aspect of the present disclosure, provided is a tire frame, which is prepared from the tire cord steel, or from the tire cord steel obtained by the method.

BRIEF DESCRIPTION OF THE DRAWINGS

FIG. 1 shows an exemplary flowchart of a rolling method of a tire cord steel with high strength and low wire breakage rate according to one or more embodiments of the present disclosure.

DETAILED DESCRIPTION

In order to make the purpose, technical solutions and advantages of embodiments of the present disclosure clearer, the technical solutions in the present disclosure will be clearly and completely described below in conjunction with drawings in the embodiments of the present disclosure. Apparently, the described embodiments are some, but not all, of the embodiments of the present disclosure. Based on the embodiments in the present disclosure, any other embodiments obtained by persons of ordinary skill in the art without creative efforts shall fall within the protection scope of the present disclosure.

The present disclosure provides a tire cord steel with high strength and low wire breakage rate, the chemical composition of which may include by mass fraction: C: 0.80%-0.85%, Mn: 0.46%-0.59%, Nb: 0.006%-0.012%, V: 0.006%-0.012%, Si: 0.15%-0.25%, P≤0.01%, S≤0.01%, B: 0.0005%-0.0009%, Als≤0.0008%, Ti≤0.0005%, and the rest being Fe and inevitable impurities. The chemical composition of the tire cord steel may further include N, and the mass fractions of Nb, V, and N satisfy the following relationships: ([Nb]+[V])/[N] may be 3-4.5, [Nb] representing the mass fraction of Nb element, [V] representing the mass fraction of V element, and [N] representing the mass fraction of N element.

In an embodiment of the present disclosure, C is the most important constituent element in the tire cord steel, and has the most significant influence on strength and plasticity of the wire rod of tire cord steel. The mass fraction of C may be limited to 0.80-0.85% so as to ensure a stability of thermal conductivity and drawability performance of the final product, and to make the strength and plasticity of the wire rod meet the standard. If a value range of mass fraction of C is too large, it is indicated that a content of carbon is too much, leading to a continuous improvement of the strength of the wire rod but a sharp deterioration in the plasticity of the wire rod, and further leading to greater difficulty in production control and poorer stability of product quality. If the value range of the mass fraction of C is too small, it is indicated that the content of carbon is insufficient, leading to a continuous decrease in the strength of the wire rod and a sharp increase in the plasticity of the wire rod, and further leading to greater difficulty in production control and poorer stability of product quality.

Si is an important strengthening element in steel, and may significantly increase an elastic limit of the tire cord steel after being drawn, thereby reducing wire breakage rate. The positive effect of limiting the mass fraction of Si to be 0.15%-0.25% is that it may effectively reduce the degree of strength reduction of the tire cord steel caused by a heat treatment. Meanwhile, the Si element may also slow down breakage of cementite in the process of drawing, which may improve a comprehensive mechanical property of the tire cord steel. If the value range of mass fraction of Si is too large, it is indicated that the content of Si is too high, which may increase brittleness of a ferrite and affect strength and breakage rate of final tire cord steel product. If the value range of mass fraction of Si is too small, it is indicated that the content of Si is too low, which may lead to insufficient elastic limit of the tire cord steel product and may cause the tire cord steel product to be easily broken to a certain extent.

Mn is capable of combining with sulfur to form MnS, which may alleviate harm of sulfur, refines a pearlite, and improves a strength of the tire cord steel. The positive effect of limiting the mass fraction of Mn to be 0.46%-0.59% is that it may prevent segregation of Mn in the tire cord steel to realize a uniform distribution of structure, thereby improving a performance of the tire cord steel. If the value range of mass fraction of Mn is too large, Mn may be caused to be segregated, resulting in an uneven distribution of structure, and thus leading to a deterioration in the performance of the tire cord steel product, and an excessively high content of Mn may also increase production costs. If the value range of mass fraction of Mn is too small, it is indicated that the content of Mn is too small, and the pearlite cannot be sufficiently refined, so that an uniformity degree of structure of the tire cord steel is insufficient, and thus it, to a certain extent, make the strength of a steel wire insufficient.

P and S are harmful elements. Phosphorus is prone to causing cold-embrittlement, and sulfur is prone to causing hot-embrittlement, leading to a decrease in the strength of the tire cord steel, thereby affecting mechanical property of the tire cord steel. The positive effect of controlling the mass fraction of P and the mass fraction of S to be both less than 0.01% is that the P and S can be prevented from deteriorating the mechanical property of the tire cord steel in a hot-rolling stage.

B is capable of inhibiting an enrichment of P at grain boundaries, and may improve a morphology of inclusions, so that the inclusions may be refined and evenly distributed, thereby preventing an aggregation of the inclusions, thus improving a cold machining performance of the wire rod. The positive effect of limiting the mass fraction of B to 0.0005%-0.0009% is that it may prevent an excessive boron from weakening a binding force of the grain boundaries and avoid the inclusions from aggregating into block which affects the uniform distribution of structure, thereby preventing mechanical property of the wire rod of the tire cord steel from deteriorating.

Nb is capable of preventing a growth of austenite grains, and to a certain extent, it may also refine reheated austenite grains, which may improve the uniformity of structure and performance. The Nb and carbon segregated at the grain boundaries may form a relatively stable structure. The relatively stable structure may hinder a diffusion of carbon along the grain boundaries, thereby reducing a decarburization sensitivity of the tire cord steel with medium and high content of carbon. The positive effect of limiting the mass fraction of Nb to 0.006%-0.012% is that it may prevent an excessive Nb from degrading a pearlite structure and from accelerating a spheroidization of cementite. The degradation of the pearlite structure and acceleration of the spheroidization of cementite are harmful to an improvement of the strength of the steel wire.

V is capable of alleviating a precipitation of cementite at pro-eutectoid grain boundaries, may also inhibit the growth of austenite grains, and may form precipitation strengthening to improve a strength-ductility of the wire rod and the steel wire. The positive effect of the mass fraction of V being 0.006-0.012% is that an appropriate amount of V may refine an interlamellar spacing of the pearlites. If the value range of mass fraction of V is too large, large particles of V-N will be formed, which may coarsen the interlamellar spacing, thereby resulting in drawing or torsional fracture of wire.

The positive effect of the mass fraction of $Als \leq 0.0008\%$ is that a content of acid-soluble aluminum may be controlled not to be too large, so that a content of acid-insoluble aluminum in a steel material may be increased, thereby improving a toughness of the steel material.

The positive effect of the mass fraction of $Ti \leq 0.0005\%$ is that as Ti may enhance a structure of the tire cord steel, and a compound of Ti may further enhance a hardness of the tire cord steel but is not conducive to the toughness of the tire cord steel. Therefore, a content of Ti is controlled at 0.0005% or less to obtain the tire cord steel with better toughness.

The positive effect of a proportional relationship between a sum of the mass fractions of Nb and V and the mass fraction of N being 3 to 4.5 times is that it may not only give full play to an effect of complex microalloying of Nb and V, but also avoid the deterioration of performance of the tire cord steel caused by the N element. Nb and V need to be combined with N elements to achieve an effect of microalloying elements, but the N element, as a harmful element in traditional tire cord steel, needs to be strictly limited. If the mass fraction of N is too large, it is indicated that the content of N is too much. Too much content of nitrogen may affect a process of complex microalloying of Nb and V, and may also lead to the deterioration of performance of the tire cord steel. If the mass fraction of N is too small, it is indicated that the content of N is small. Since the effect of microalloying elements of Nb and V cannot be achieved if Nb and V are separated from the N element with which Nb and V are combined, when the content of N is too small, the process of complex microalloying of Nb and V will not be activated, which may affect the stability of the tire cord steel and reduce the performance of the tire cord steel.

The above-mentioned components may be coordinated with one another, and a monofilament product of tire cord steel with low wire breakage rate of strand and high-strength may be obtained by controlling the proportional relationship of the sum of the mass fractions of Nb and V and the mass fraction of N.

In one or more embodiments, a metallographic structure of the tire cord steel includes a lamellar pearlite, the lamellar pearlite including a sorbite and a pearlite.

In an embodiment of the present disclosure, the metallographic structure of the tire cord steel is controlled to include lamellar pearlite, and then components of the lamellar pearlite are controlled to include a sorbite and a pearlite. The overall mechanical performance of the tire cord steel can be comprehensively improved due to a good mechanical performance of the sorbite and the pearlite both.

In one or more embodiments, an interlamellar spacing of the lamellar pearlite may be 160 nm-170 nm.

In an embodiment of the present disclosure, the positive effect of the interlamellar spacing of the lamellar pearlite being 160 nm-170 nm is that, within the interlamellar spacing, the lamellar pearlite may be evenly distributed, so that the metallographic structure of the tire cord steel may be evenly distributed, and a strength and a toughness of the tire cord steel may be improved. If the interlamellar spacing of the lamellar pearlite is too large the strength of the tire cord steel in a longitudinal direction may be affected, thereby affecting the toughness of the tire cord steel to a certain extent. If the interlamellar spacing of the lamellar pearlite is too small the strength of the tire cord steel in a transverse direction may be affected, thereby affecting the hardness of the tire cord steel to a certain extent.

In one or more embodiments, a sorbitizing rate of the lamellar pearlite may be ≥98%.

In an embodiment of the present disclosure, the positive effect of the sorbitizing rate being ≥98% is that a high content of sorbite may improve overall mechanical performance of the tire cord steel, since the sorbite has good mechanical performance and has higher hardness, higher strength and higher impact toughness than the pearlite. When a value of the sorbitizing rate is too small, it is indicated that the content of sorbite is too small, which will cause the mechanical performance of the tire cord steel to be too low to a certain extent.

In one or more embodiments, a content by volume fraction of the sorbite may be 80%-95%, and the content by volume fraction of the pearlite may be 5%-20%.

In an embodiment of the present disclosure, the positive effect of the content by volume fraction of the sorbite being 80%-95% is that, within this range of the content by volume fraction, the content of the sorbite may be sufficient, and the high content of sorbite may improve overall mechanical performance of the tire cord steel since the sorbite has good mechanical performance and has higher hardness, higher strength and higher impact toughness than pearlite.

The positive effect of the content by volume fraction of the pearlite being 5%-20% is that, within this range of the content by volume fraction, the content of the sorbite may be stable, avoiding too little content of the sorbite caused by too much content of the pearlite, thereby improving overall mechanical performance of the tire cord steel to a certain extent.

As shown in FIG. 1, the present disclosure further provides a method for rolling the tire cord steel with high strength and low wire breakage rate, and the method includes:

S1, obtaining a steel billet of the tire cord steel; and

S2, sequentially performing a heating-before-rolling, a hot-rolling and a cooling-after-rolling on the steel billet to obtain a wire rod of the tire cord steel;

the heating-before-rolling includes a preheating stage, a first heating stage, a second heating stage and a soaking stage, and the hot-rolling may sequentially include a rough rolling, an intermediate rolling, a pre-finish rolling, a finish rolling, and a sizing and reducing.

In one or more embodiments, a preheating temperature of the preheating stage may be ≤400° C., and a preheating time of the preheating stage may be ≥5 min;

a terminal temperature of heating temperature of the first heating stage may be 400° C.-800° C., and a heating time of the first heating stage may be ≥10 min;

a terminal temperature of heating temperature of the second heating stage may be 800° C.-1000° C., and a heating time of the second heating stage may be 60 min-100 min; and a soaking temperature of the soaking stage may be 1000° C.-1040° C., and a soaking time of the soaking stage may be 20 min-60 min.

In an embodiment of the present disclosure, the positive effect of controlling the preheating temperature of the preheating stage to be ≤400° C. is that, within this temperature range, a steel material before being rolled may be fully heated, so that an austenite inside the steel material may begin to be gradually transformed. If a value range of the preheating temperature is too large, too high preheating temperature of the preheating stage may increase a transformation speed of the austenite, but the too high preheating temperature of the preheating stage may also overheat the steel material, which will affect the metallographic structure formation to a certain extent during a rolling process.

The positive effect of the preheating time being ≥5 min is that it may provide sufficient preheating time to transform the austenite into a target state. If a value range of this preheating time is too small, the too short preheating time may lead to insufficient time of transformation of the austenite, which may make the metallographic structure of the steel material uneven after being rolled, and affect the strength and toughness of the steel material to a certain extent.

The positive effect of the terminal temperature of heating temperature of the first heating stage being 400° C.-800° C. is that, the steel material heated in the preheating stage may be further heated, so that the austenite of the steel material may begin to be rapidly transformed within the first heating stage. If the value range of the terminal temperature of heating temperature of the first heating stage is too large, the too high terminal temperature of heating temperature of the first heating stage may make a speed of transformation of the austenite too fast, which will affect the uniformity degree of the metallographic structure formation during the first heating stage to a certain extent. If the value range of the terminal temperature of heating temperature of the first heating stage is too small, the too low terminal temperature of heating temperature of the first heating stage is insufficient for the austenite to transform into the target state.

The positive effect of the heating time of the first heating stage being ≥10 min is that the heating time of the steel material in the first heating stage can be sufficient, so that the austenite may be fully transformed within the first heating time. If the value range of the heating time of the first heating stage is too small, the too short first heating time may lead to insufficient time of transformation of the austenite, which makes the metallographic structure of the steel material uneven after being rolled, and affect the strength and toughness of the steel material to a certain extent.

The positive effect of the terminal temperature of heating temperature of the second heating stage being 800° C.-1000° C. is to enable the steel material after heated in the first heating stage to undergo further transformation of austenite within the second heating stage. If the value range of the terminal temperature of heating temperature of the second heating stage is too large, the too high terminal temperature of heating temperature of the second heating stage may make the speed of transformation of the austenite too fast, which will affect the uniformity degree of the metallographic structure during the second heating stage to a certain extent. If the value range of the terminal temperature of heating temperature of the second heating stage is too small, the too low terminal temperature of heating temperature of the second heating stage may be insufficient for the austenite to transform into the target state.

The positive effect of the heating time of the second heating stage being 60 min-100 min is that the heating time of the steel material in the second heating stage can be sufficient, so that the austenite may be fully transformed within the second heating time. If the value range of the heating time of the second heating stage is too small, the too short heating time of the second heating stage may lead to a time of transformation of the austenite insufficient, which makes the metallographic structure of the steel material uneven after being rolled, and affect the strength and toughness of the steel material to a certain extent.

The positive effect of the soaking temperature of the soaking stage being 1000° C.-1040° C. is that the temperature required for the transformation of austenite can be maintained. If the value range of the soaking temperature of the soaking stage is too large, the too high soaking temperature of the soaking stage may cause the austenie to be completely transformed, but an excessive energy is consumed, which will affect an energy consumption of process to a certain extent. If the value range of the soaking temperature of the soaking stage is too small, the austenite cannot start to transform, resulting in uneven metallographic structure of the steel material, which will affect the strength and toughness of the steel material to a certain extent.

The positive effect of the soaking time of the soaking stage being 20 min-60 min is that the austenite in the steel material after heated in the second heating stage may be completely transformed in the soaking stage. If the value range of the soaking time of the soaking stage is too large, the too long soaking time of the soaking stage may make the process take too long. If the value range of the soaking time of the soaking stage is too small, the austenite in the steel material cannot be completely transformed during too short soaking time of the soaking stage, which will affect the uniformity degree of the metallographic structure of the steel material to a certain extent.

In one or more embodiments, an inlet temperature of the finish rolling may be 950° C.-990° C.; the inlet temperature of the sizing and reducing may be 940° C.-980° C., and the spinning temperature of the sizing and reducing may be 935° C.-965° C.

In an embodiment of the present disclosure, the positive effect of the inlet temperature of the finish rolling being 950° C.-990° C. is that controlling the inlet temperature of the finish rolling may cause the metallographic structure of the steel material to be evenly distributed, and the steel material with target strength and toughness may be obtained. If the value range of the inlet temperature of the finish rolling is too large, the too high inlet temperature of the finish rolling may increase the energy consumption of process. If the value range of the inlet temperature of the finish rolling is too small, the too low inlet temperature of the finish rolling may lead to uneven distribution of the metallographic structure during the rolling process of steel material, which may affect the uniformity degree of the metallographic structure, and then affect the strength and toughness of the steel material to a certain extent.

The positive effect of the inlet temperature of the sizing and reducing being 940° C.-980° C. is that controlling the inlet temperature of the sizing and reducing may make the metallographic structure of the steel material to be evenly distributed after being sized and reduced, and the steel material with target strength and toughness may be obtained. If the value range of the inlet temperature of the sizing and reducing is too large, the too high inlet temperature of the sizing and reducing may increase the energy consumption of process. If the value range of the inlet temperature of the sizing and reducing is too small, the too low inlet temperature of the sizing and reducing may lead to uneven distribution of the metallographic structure during the rolling process of the steel material, which may affect the uniformity of the metallographic structure to a certain extent, and then affect the strength and toughness of the steel material.

The positive effect of the spinning temperature of the sizing and reducing being 935° C.-965° C. is that the metallographic structure in the formed tire cord steel may be stabilized, so that the strength and toughness of the tire cord steel material may be stabilized. If the value range of the spinning temperature of the sizing and reducing is too large, the too high spinning temperature of the sizing and reducing may increase the energy consumption of process. If the value range of the spinning temperature of the sizing and reducing is too small, the too low spinning temperature of the sizing and reducing may lead to uneven distribution of the metallographic structure during the rolling process of the steel material, which may affect the uniformity degree of the metallographic structure to a certain extent, and then affect the strength and toughness of the steel material.

In one or more embodiments, the cooling-after-rolling may be performed by using a Stelmor air-cooling line; and the Stelmor air-cooling line may include an entrance group of roller table, n groups of roller tables and n+6 fans, and n is a positive integer.

In an embodiment of the present disclosure, the positive effect of using the Stelmor air-cooling line for the cooling-after-rolling is that it may strengthen the control of a cooling speed in a cooling stage, and may prevent the uniformity degree of the metallographic structure of the steel material from being affected by the too fast or too slow cooling speed.

In one or more embodiments, a speed of entrance group of roller table may be 15 m/min-20 m/min. When n=1, a speed of a first group of roller table may be 30 m/min-40 m/min, and a speed of a $n^{th}$ group of roller table may be improved by 5%-7% over a speed of n-$1^{th}$ group of roller table.

In an embodiment of the present disclosure, the positive effect of the speed of entrance group of roller table being 15 m/min-20 m/min is that an entering speed of the steel material entering an air-cooling process can be controlled, so that the steel material may be completely cooled in the air-cooling process. If the value range of the entering speed is too large, the too fast entering speed may cause the steel material to enter the air cooling speed too fast, which will affect the cooling and forming of the metallographic structure of the steel material to a certain extent. If the value range of the entering speed is too small, the too low entering speed will not allow the rolled steel material enter the air cooling process in time, resulting in the steel material to be cooled at an interface of an outlet of the rolling process and an inlet of the Stelmor air-cooling line, which will affect the control of a cooling degree of the steel material to a certain extent.

The positive effect of the speed of first group of roller table being 30 m/min-40 m/min is that a moving speed of the steel material when the steel material starts to be cooled can be controlled, so that when the steel material starts to be cooled, the moving speed of the steel material may match the cooling speed. If the value range of the moving speed is too large, the too fast moving speed may lead to insufficient cooling time for the steel material, which will affect the cooling effect of the steel material to a certain extent. If the value range of the moving speed is too small, the too slow moving speed may lead to a cooling range of the steel material uneven, affect a subsequent moving speed of the steel material and affect the cooling degree of the steel material to a certain extent.

The positive effect of the speed of n th group of roller table being improved by 5%-7% over the speed of n-1th group of roller table is that, by gradually increasing a speed of cooling roller, the moving speed of the steel material may be gradually increased, and a cooling time may be gradually reduced, so as to realize a gradient control of the cooling speed, and the steel material may be fully cooled to a certain extent.

In one or more embodiments, opening degrees of a first fan and a second fan may be 75%-95%, i.e. an air intake volume of the first fan and the second fan per unit time can be 75% to 95% of a full load of air intake volume of 160000 $m^3$/h. If the temperature at lapping points of the wire rods at an inlet of the third fan is 660° C.-710° C., the opening degrees of the third fan to the sixth fan may be 45%-55%, and the rest fans are in inactive state.

In an embodiment of the present disclosure, the positive effect of the opening degrees of the first fan and the second fan being 75%-95% is that the cooling degree of the steel material at the entrance group of roller table and then groups of roller tables in the Stelmor air-cooling line can be controlled, so that the steel material may reach a target cooling degree. If the value range of the opening degree is too large, the too high opening degree may make the cooling speed of the steel material too fast, which will affect the control of the cooling speed of the steel material to a certain extent. If the value range of the opening degree is too small, the too small opening degree may reduce the cooling degree of the steel material, which will affect the cooling effect of the steel material to a certain extent.

The positive effect of the opening degrees of the third fan to the sixth fan all being 45%-55% is that, the cooling degree of the steel material in a subsequent process can be controlled, so that the cooling degree of the steel material may reach the target cooling degree. If the value range of the opening degrees is too large, the too high opening degrees may make the cooling speed of the steel material too fast, which will affect the control of the cooling speed of the steel material to a certain extent. If the value range of the opening degrees is too small, the too small opening degrees may reduce the cooling degree of the steel material, which will affect the cooling effect of the steel material to a certain extent.

In one or more embodiments, in the heating-before-rolling, a length and a width of cross-section of the steel billet may be 160 mm-200 mm and 160 mm-200 mm, respectively.

In an embodiment of the present disclosure, the positive effect of the length and width of cross-section of the steel billet being 160 mm-200 mm and 160 mm-200 mm respectively is that, the obtained steel billet can be evenly distributed in a rolling machine, which may facilitate a smooth progress of subsequent rolling process. If the value range of the length and width is too large, it does not meet a maximum standard of size requirements of the rolling machine. If the value range of the length and width is too small, a stability of the steel billet in a rolling stage will be affected to a certain extent due to a large gap during the rolling process.

In the method provided by the present disclosure, a fine-tuning of the wire breakage rate of strand may be realized by adjusting process parameters during the heating-before-rolling, the hot-rolling and the cooling-after-rolling to adjust a tensile strength of a hot-rolled wire rod and the tensile strength of the final monofilament of tire cord steel. Therefore, the processes of the heating-before-rolling, the hot-rolling and the cooling-after-rolling can be controlled according to use requirements of different products, so that the tire cord steel products that meet the requirements can be obtained.

The chemical compositions in various Examples and Comparative Examples are as shown in table 1:

TABLE 1

| | | | | | | | | | | | |
|---|---|---|---|---|---|---|---|---|---|---|---|
| The chemical compositions (%) in Examples and Comparative Examples | | | | | | | | | | | |
| Item | C | Si | Mn | P | S | B | Nb | V | Multiples | Als | Ti |
| Example 1 | 0.85 | 0.17 | 0.52 | 0.005 | 0.006 | 0.0009 | 0.009 | 0.006 | 3.2 | 0.0005 | 0.0005 |
| Example 2 | 0.84 | 0.16 | 0.55 | 0.001 | 0.004 | 0.0005 | 0.009 | 0.008 | 4.1 | 0.0004 | 0.0005 |
| Example 3 | 0.83 | 0.18 | 0.55 | 0.005 | 0.008 | 0.0006 | 0.010 | 0.007 | 3.5 | 0.0003 | 0.0004 |
| Example 4 | 0.82 | 0.18 | 0.55 | 0.001 | 0.005 | 0.0007 | 0.008 | 0.009 | 3.5 | 0.0005 | 0.0003 |
| Example 5 | 0.82 | 0.19 | 0.51 | 0.004 | 0.005 | 0.0005 | 0.006 | 0.012 | 3.5 | 0.0005 | 0.0004 |
| Example 6 | 0.80 | 0.20 | 0.55 | 0.007 | 0.001 | 0.0005 | 0.006 | 0.008 | 3.4 | 0.0004 | 0.0003 |
| Example 7 | 0.85 | 0.22 | 0.48 | 0.006 | 0.006 | 0.0006 | 0.008 | 0.006 | 4.1 | 0.0003 | 0.0005 |
| Example 8 | 0.84 | 0.15 | 0.45 | 0.004 | 0.004 | 0.0009 | 0.007 | 0.006 | 3.5 | 0.0005 | 0.0003 |
| Example 9 | 0.83 | 0.18 | 0.46 | 0.008 | 0.007 | 0.0006 | 0.009 | 0.008 | 3.5 | 0.0005 | 0.0004 |
| Example 10 | 0.82 | 0.18 | 0.47 | 0.005 | 0.006 | 0.0007 | 0.009 | 0.007 | 3.5 | 0.0004 | 0.0003 |
| Example 11 | 0.82 | 0.19 | 0.48 | 0.005 | 0.004 | 0.0005 | 0.009 | 0.009 | 3.4 | 0.0003 | 0.0005 |
| Example 12 | 0.81 | 0.25 | 0.59 | 0.001 | 0.008 | 0.0005 | 0.009 | 0.009 | 3.1 | 0.0005 | 0.0005 |
| Example 13 | 0.85 | 0.22 | 0.52 | 0.004 | 0.005 | 0.0006 | 0.010 | 0.009 | 4.2 | 0.0004 | 0.0004 |
| Example 14 | 0.81 | 0.23 | 0.53 | 0.007 | 0.005 | 0.0009 | 0.011 | 0.010 | 4.2 | 0.0005 | 0.0003 |
| Example 15 | 0.84 | 0.25 | 0.55 | 0.003 | 0.001 | 0.0009 | 0.012 | 0.011 | 4.3 | 0.0004 | 0.0005 |
| Comparative Example 1 | 0.88 | 0.22 | 0.60 | 0.006 | 0.005 | 0.0003 | 0.0005 | 0.0004 | / | 0.0010 | 0.0008 |
| Comparative Example 2 | 0.86 | 0.23 | 0.61 | 0.004 | 0.005 | 0.0002 | 0.0004 | 0.0006 | / | 0.0010 | 0.0009 |
| Comparative Example 3 | 0.88 | 0.22 | 0.62 | 0.008 | 0.001 | 0.0003 | 0.0007 | 0.0005 | / | 0.0009 | 0.0008 |

In the table 1, the number in the item of Multiples refers to how many times the sum of the mass fractions of Nb and V is the mass fraction of N.

The process parameters of heating-before-rolling in various Examples and Comparative Examples are shown in table 2:

TABLE 2

| | | | | | | | | | |
|---|---|---|---|---|---|---|---|---|---|
| | | \multicolumn{9}{l}{The process parameters of heating-before-rolling in Examples and Comparative Examples} |
| | Billet | Preheating stage | | First heating stage | | Second heating stage | | Soaking stage | |
| Item | section (mm2) | Temperature (° C.) | Time (min) | Temperature (° C.) | Time (min) | Temperature (° C.) | Time (min) | Temperature (° C.) | Time (min) |
| Example 1 | 160 × 160 | 400° C. | 5 | 800° C. | 15 | 900° C. | 86 | 1010 | 40 |
| Example 2 | 170 × 170 | 400° C. | 6 | 800° C. | 13 | 1000° C. | 60 | 1037 | 45 |
| Example 3 | 180 × 180 | 400° C. | 5 | 780° C. | 14 | 980° C. | 75 | 1010 | 60 |
| Example 4 | 160 × 160 | 380° C. | 5 | 790° C. | 15 | 970° C. | 86 | 1035 | 38 |
| Example 5 | 160 × 160 | 390° C. | 7 | 800° C. | 17 | 990° C. | 86 | 1040 | 40 |
| Example 6 | 160 × 160 | 400° C. | 6 | 800° C. | 12 | 1000° C. | 60 | 1025 | 45 |
| Example 7 | 200 × 200 | 400° C. | 5 | 800° C. | 14 | 980° C. | 75 | 1000 | 55 |
| Example 8 | 180 × 180 | 400° C. | 5 | 780° C. | 15 | 980° C. | 78 | 1035 | 38 |
| Example 9 | 190 × 190 | 400° C. | 7 | 790° C. | 17 | 900° C. | 68 | 1040 | 40 |
| Example 10 | 200 × 200 | 400° C. | 5 | 800° C. | 12 | 1000° C. | 60 | 1025 | 45 |
| Example 11 | 160 × 160 | 400° C. | 8 | 800° C. | 15 | 980° C. | 75 | 1010 | 55 |
| Example 12 | 160 × 160 | 380° C. | 6 | 800° C. | 15 | 970° C. | 78 | 1037 | 40 |
| Example 13 | 200 × 200 | 370° C. | 7 | 780° C. | 14 | 990° C. | 68 | 1040 | 43 |
| Example 14 | 200 × 200 | 390° C. | 5 | 770° C. | 15 | 800° C. | 80 | 1010 | 35 |
| Example 15 | 160 × 160 | 400° C. | 7 | 690° C. | 15 | 990° C. | 95 | 1015 | 40 |
| Comparative Example 1 | 150 × 150 | 460° C. | 35 | 910° C. | 35 | 1250° C. | 110 | 1050 | 78 |
| Comparative Example 2 | 140 × 140 | 440° C. | 36 | 890° C. | 34 | 1210° C. | 120 | 1065 | 77 |
| Comparative Example 3 | 150 × 150 | 480° C. | 22 | 920° C. | 26 | 1200° C. | 115 | 1055 | 73 |

The process parameters during the hot-rolling in various Examples and Comparative Examples are shown in table 3:

TABLE 3

| | | | | | | | | |
|---|---|---|---|---|---|---|---|---|
| | \multicolumn{8}{l}{The process parameters during the hot-rolling in Examples and Comparative Examples} |
| Item | Rolling pass of rough rolling | Rolling pass of intermediate rolling | Rolling pass of pre-finish rolling | Rolling pass of finish rolling | Inlet temperature of finish rolling (° C.) | Rolling pass of sizing and reducing | Inlet temperature of sizing and reducing (° C.) | Outlet temperature (° C.) |
| Example 1 | 6 | 8 | 6 | 10 | 965 | 4 | 970 | 950 |
| Example 2 | 6 | 8 | 6 | 10 | 980 | 4 | 975 | 960 |
| Example 3 | 6 | 8 | 6 | 10 | 985 | 4 | 980 | 965 |
| Example 4 | 6 | 8 | 6 | 10 | 955 | 4 | 975 | 955 |
| Example 5 | 6 | 8 | 6 | 10 | 990 | 4 | 965 | 960 |
| Example 6 | 6 | 8 | 6 | 10 | 975 | 4 | 975 | 945 |
| Example 7 | 6 | 8 | 6 | 10 | 955 | 4 | 940 | 965 |
| Example 8 | 6 | 8 | 6 | 10 | 980 | 4 | 970 | 955 |
| Example 9 | 6 | 8 | 6 | 10 | 975 | 4 | 975 | 960 |
| Example 10 | 6 | 8 | 6 | 10 | 965 | 4 | 980 | 935 |
| Example 11 | 6 | 8 | 6 | 10 | 980 | 4 | 975 | 950 |
| Example 12 | 6 | 8 | 6 | 10 | 985 | 4 | 965 | 955 |
| Example 13 | 6 | 8 | 6 | 10 | 950 | 4 | 965 | 960 |
| Example 14 | 5 | 6 | 5 | 8 | 970 | 3 | 960 | 945 |
| Example 15 | 8 | 10 | 7 | 12 | 965 | 5 | 955 | 950 |

TABLE 3-continued

The process parameters during the hot-rolling in Examples and Comparative Examples

| Item | Rolling pass of rough rolling | Rolling pass of intermediate rolling | Rolling pass of pre-finish rolling | Rolling pass of finish rolling | Inlet temperature of finish rolling (° C.) | Rolling pass of sizing and reducing | Inlet temperature of sizing and reducing (° C.) | Outlet temperature (° C.) |
|---|---|---|---|---|---|---|---|---|
| Comparative Example 1 | 9 | 11 | 8 | 13 | 910 | 6 | 910 | 890 |
| Comparative Example 2 | 4 | 5 | 4 | 7 | 880 | 2 | 890 | 900 |
| Comparative Example 3 | 6 | 8 | 6 | 8 | 880 | 4 | 890 | 900 |

The process parameters during the cooling-after-rolling of various Examples and Comparative Examples are shown in table 4:

TABLE 4

The process parameters during cooling-after-rolling of Examples and Comparative Examples

| Item | Speed of entrance group of roller table (m/min) | Speed of first group of roller table (m/min) | Extreme value of Difference in roller speed (%) | Opening degree of first fan and second fan (%) | Temperature at lapping points of wire rods at inlet of third fan (° C.) | Opening degree of third fan to sixth fan (%) |
|---|---|---|---|---|---|---|
| Example 1 | 18 | 35 | 5 | 90 | 710 | 50 |
| Example 2 | 18 | 35 | 6 | 95 | 660 | 55 |
| Example 3 | 18 | 35 | 5 | 95 | 700 | 45 |
| Example 4 | 18 | 35 | 6 | 95 | 705 | 50 |
| Example 5 | 18 | 35 | 5 | 85 | 700 | 50 |
| Example 6 | 18 | 35 | 6 | 90 | 700 | 55 |
| Example 7 | 18 | 35 | 5 | 95 | 685 | 50 |
| Example 8 | 18 | 35 | 5 | 75 | 675 | 45 |
| Example 9 | 18 | 35 | 6 | 90 | 700 | 50 |
| Example 10 | 18 | 35 | 5 | 95 | 705 | 50 |
| Example 11 | 18 | 35 | 6 | 95 | 700 | 55 |
| Example 12 | 18 | 35 | 7 | 90 | 695 | 50 |
| Example 13 | 18 | 35 | 5 | 95 | 685 | 55 |
| Example 14 | 18 | 35 | 5 | 95 | 700 | 50 |
| Example 15 | 18 | 35 | 6 | 85 | 705 | 50 |
| Comparative Example 1 | 21 | 42 | 4 | 70 | 640 | 25 |
| Comparative Example 2 | 14 | 29 | 4 | 70 | 655 | 30 |
| Comparative Example 3 | 18 | 35 | 2 | 70 | 645 | 30 |

Related Experiments

The tire cord steels prepared in Examples 1-15 and Comparative Examples 1-3 were tested for performance, and test results are shown in Table 5.

TABLE 5

Results of performance tests

| Item | Hot-rolled wire rod | | Final monofilament of tire cord steel | |
|---|---|---|---|---|
| | Diameter, mm | Tensile strength, MPa | Tensile strength, MPa | Wire breakage rate of strand (tons of steel) (Target < 4) |
| Example 1 | 5.5 | 1205 | 4070 | 1.0 |
| Example 2 | 5.5 | 1250 | 4075 | 1.2 |
| Example 3 | 5.5 | 1220 | 4080 | 1.5 |
| Example 4 | 5.5 | 1240 | 4135 | 1.3 |

TABLE 5-continued

Results of performance tests

| Item | Hot-rolled wire rod | | Final monofilament of tire cord steel | |
|---|---|---|---|---|
| | Diameter, mm | Tensile strength, MPa | Tensile strength, MPa | Wire breakage rate of strand (tons of steel) (Target < 4) |
| Example 5 | 5.5 | 1240 | 4038 | 1.4 |
| Example 6 | 5.5 | 1240 | 4050 | 1.2 |
| Example 7 | 5.5 | 1235 | 4040 | 1.3 |
| Example 8 | 5.5 | 1240 | 4040 | 1.1 |
| Example 9 | 5.5 | 1230 | 4050 | 1.3 |
| Example 10 | 5.5 | 1210 | 4045 | 1.4 |
| Example 11 | 5.5 | 1205 | 4040 | 1.5 |
| Example 12 | 5.5 | 1245 | 4038 | 1.4 |
| Example 13 | 5.5 | 1210 | 4050 | 1.5 |
| Example 14 | 6.5 | 1205 | 4040 | 1.5 |
| Example 15 | 6.5 | 1235 | 4055 | 1.5 |

15

TABLE 5-continued

Results of performance tests

| | Hot-rolled wire rod | | Final monofilament of tire cord steel | |
| Item | Diameter, mm | Tensile strength, MPa | Tensile strength, MPa | Wire breakage rate of strand (tons of steel) (Target < 4) |
|---|---|---|---|---|
| Comparative Example 1 | 5.5 | 1175 | 3855 | 4.5 |
| Comparative Example 2 | 5.5 | 1168 | 3765 | 4.6 |
| Comparative Example 3 | 6.5 | 1176 | 3970 | 4.7 |

In table 5, the tensile strength of the hot-rolled wire rod refers to the tensile strength of the wire rod obtained after hot-rolling. The higher the tensile strength is, the higher the toughness of the wire rod of the tire cord steel after hot-rolling is.

The tensile strength of the final monofilament of tire cord steel refers to the tensile strength of the monofilament of tire cord steel finally obtained. The higher the tensile strength is, the better the toughness of the tire cord steel product is.

The wire breakage rate of strand of the final monofilament of tire cord steel refers to the strength and toughness of the monofilament of tire cord steel finally obtained. The lower the wire breakage rate of strand is, the better the strength and toughness of the tire cord steel product is.

As can be seen from the data in Examples 1-15:

(1) by controlling the process parameters of the heating-before-rolling, the hot-rolling and the cooling-after-rolling, the tensile strength of the final monofilament of tire cord steel of the hot-rolled wire rod can be controlled and the wire breakage rate of strand can be controlled in the case that contents of various chemical compositions of the tire cord steel vary a little, as shown in Table 1 that the contents of various chemical compositions of the tire cord steel in Example 1-15 vary a little.

(2) through a metallographic analysis of the metallographic structure of the obtained tire cord steel, it can be found that the interlamellar spacing of the lamellar pearlite of the metallographic structure of the obtained tire cord steel is 160 nm-170 nm, and the sorbitizing rate of the lamellar pearlite is ≥98%.

As can be seen from the data of Comparative Examples 1-3:

(1) If the proportional relationship of the sum of the mass fractions of Nb and V and the mass fraction of N is not controlled, or if N is not added, the tensile strength of the hot-rolled wire rod and the tensile strength of the final monofilament of tire cord steel may be reduced. It may lead to a significant increase in wire breakage rate of strand.

As for the tire cord steel provided by the present disclosure, the austenite grain growth may be prevented by maintaining the C element in the tire cord steel within a certain content range and by further adding Nb. Reheated austenite grains are refined, thereby reducing the decarburization sensitivity of the tire cord steel with medium and high content of carbon to a certain extent. Addition of V may alleviate the precipitation of pro-eutectoid grain boundary cementite, may also inhibit the growth of austenite grains, may form precipitation strengthening, and may further improve the strength-ductility of wire rod and steel wire products of the tire cord steel. By controlling the proportional relationship between the mass fractions of Nb, V and N, the content of the harmful element N may be controlled, and the effect of microalloying elements between Nb and V may be controlled, which may stabilize the microstructure of the tire cord steel. Therefore, it may improve the strength and toughness performance of the tire cord steel without increasing the content of carbon, and may also reduce the wire breakage rate of the tire cord steel. It may not only reduce the production cost of iron and steel enterprises, but also meet the requirements of downstream users for improving the strength-ductility of steel wires. It has a good market application prospect and is expected to fully replace the existing traditional tire cord steel.

It should be noted that in the present disclosure, relative terms such as "first" and "second" are only used to distinguish one entity or operation from another entity or operation, and do not necessarily require or imply any such actual relationship or order between these entities or operations. Furthermore, the terms "include", "comprise" or any other variation thereof are intended to cover non-exclusive inclusions so that a process, method, article or device including a series of elements includes not only those elements, but also other elements not expressly listed, or elements inherent in such process, method, article or device. Without further limitations, an element defined by the phrase "comprising a . . . ", does not exclude the presence of additional identical elements in the process, method, article or device comprising said element.

The above descriptions are only one or more embodiments of the present disclosure, enabling those skilled in the art to understand or implement the present disclosure. Various modifications to these embodiments will be readily apparent to those skilled in the art, and the general principles defined herein may be implemented in other embodiments without departing from the spirit or scope of the present disclosure. Therefore, the present disclosure will not be limited to the embodiments shown herein, but is to be accorded the widest scope consistent with the principles and novel features claimed in the present disclosure.

What is claimed is:

1. A method for rolling tire cord steel, comprising:

obtaining a steel billet; and sequentially performing a heating-before-rolling, a hot-rolling and a cooling-after-rolling on the steel billet to obtain a wire rod of the tire cord steel;

wherein the heating-before-rolling comprises a preheating stage, a first heating stage, a second heating stage and a soaking stage, and the hot-rolling adopts an austenite crystallization controlled-rolling and the hot-rolling sequentially comprises a rough rolling, an intermediate rolling, a prefinish rolling, a finish rolling, and a sizing and reducing;

wherein a preheating temperature of the preheating stage is ≤400° C., and a preheating time of the preheating stage is ≥5 min;

a terminal temperature of heating temperature of the first heating stage is between 400° C.-800° C., and a heating time of the first heating stage is ≥10 min;

a terminal temperature of heating temperature of the second heating stage is between 800° C.-1000° C., and a heating time of the second heating stage is between 60 min-100 min; and a soaking temperature of the soaking stage is 1000° C.-1040° C., and a soaking time of the soaking stage is 20 min-60 min;

wherein chemical compositions by mass fraction of the tire cord steel comprises:

C: 0.80%-0.85%, Mn: 0.46%-0.59%, Nb: 0.006%-0.012%, V: 0.006%-0.012%, Si: 0.15%-0.25%, P: ≤0.01%, S: ≤0.01%, B: 0.0005%-0.0009%, Als: ≤0.0008%, Ti: ≤0.0005%, Fe and inevitable impurities;

wherein the chemical compositions of the tire cord steel further comprise N, wherein ([Nb]+ [V])/[N] is between 3-4.5, and wherein the [Nb] represents a mass fraction of Nb element, the [V] represents a mass fraction of V element, and the [N] represents a mass fraction of N element.

2. The method according to claim 1, wherein an inlet temperature of the finish rolling is between 950° C.-990° C.

3. The method according to claim 1, wherein an inlet temperature of the sizing and reducing is between 940° C.-980° C., and a spinning temperature of the sizing and reducing is between 935° C.-965° C.

4. The method according to claim 1, wherein a metallographic structure of the tire cord steel comprises lamellar pearlite, the lamellar pearlite comprising a sorbite and a pearlite.

5. The method tire cord steel according to claim 4, wherein an interlamellar spacing of the lamellar pearlite is between 160 nm-170 nm.

6. The method according to claim 4, wherein a sorbitizing rate of the lamellar pearlite is ≥98%.

7. The method according to claim 4, wherein a content by volume fraction of the sorbite is between 80%-95%, and a content by volume fraction of the pearlite is between 5%-20%.

8. A tire frame, prepared from the tire cord steel prepared with the method according to claim 1.

* * * * *